Nov. 28, 1933.    A. A. HODGKINS    1,936,626
CLUTCH OPERATING MECHANISM
Filed Oct. 5, 1931    2 Sheets-Sheet 1

Inventor
Albert A. Hodgkins
By Rockwell-Bartholow
Attorney

Nov. 28, 1933.     A. A. HODGKINS     1,936,626
CLUTCH OPERATING MECHANISM
Filed Oct. 5, 1931     2 Sheets-Sheet 2
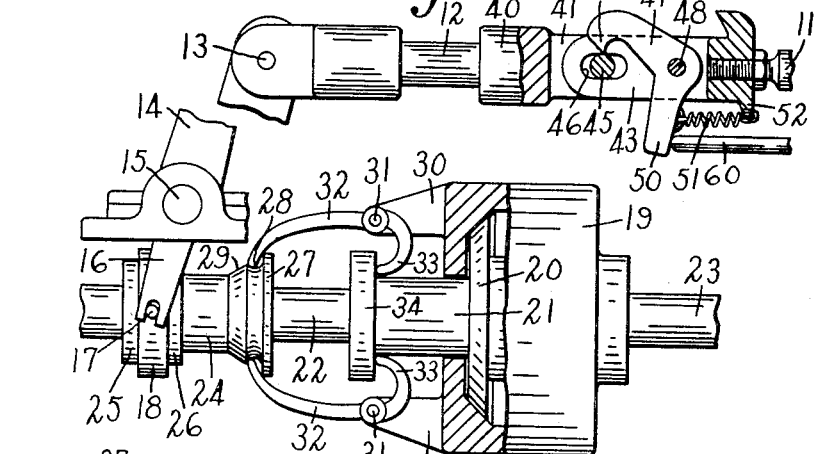
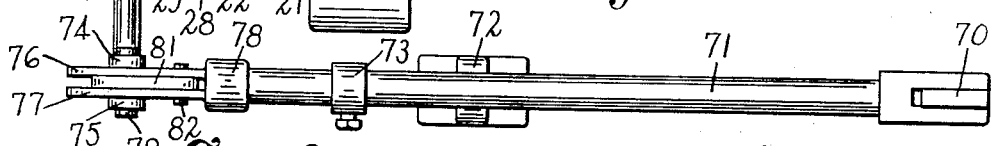
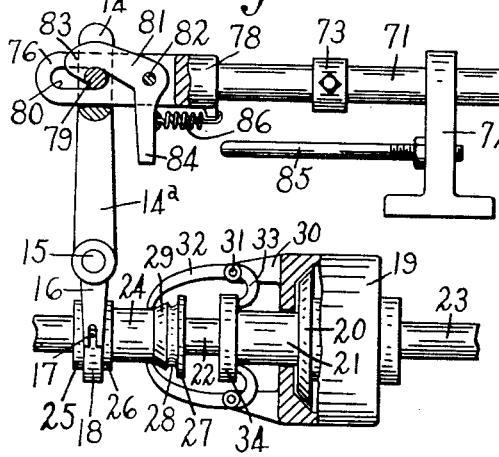
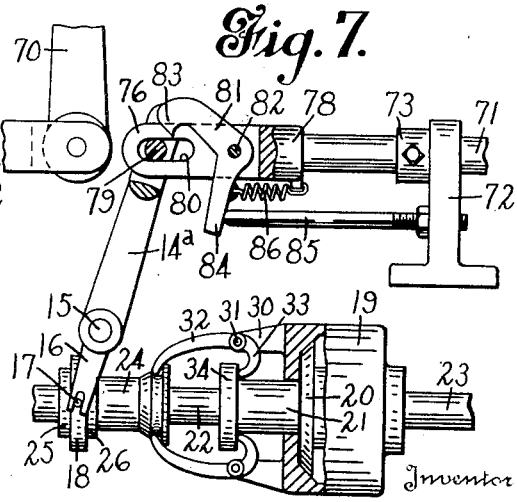

Patented Nov. 28, 1933

1,936,626

UNITED STATES PATENT OFFICE 1,936,626

CLUTCH OPERATING MECHANISM

Albert A. Hodgkins, Leonia, N. J., assignor to Universal Gear Shift Corporation, New York, N. Y.

Application October 5, 1931. Serial No. 566,889

14 Claims. (Cl. 192—99)

This invention relates to reverse gearing clutch releases and more particularly to a device for controlling reverse gears which is provided with means for releasing the pressure upon the clutch collar or other operating means when the parts of the gearing have been set in the desired position. While my invention is shown and described in connection with the operation of reverse gears, it will be understood that it is applicable in other relations where control levers are employed.

In the operation of so-called reverse gears commonly used in connection with marine engines, for example, a lever or other control device is arranged to move a collar on the driven shaft to set the clutch in a given position, for instance, in position for forward drive. As will appear as the description proceeds, this is usually accomplished by means of a clutch collar operated by a lever having a bifurcated end to engage the collar, the collar being rotatably engaged between flanges on a sleeve slidably but non-rotatably secured to the driven shaft. It will be understood that this sleeve rotates within and relatively to the collar and if this collar is pressed tightly against one or the other of the abutting flanges on the sleeve, considerable friction will result and the contacting parts may be damaged or, in fact, may be burned out.

One object of the invention is to provide a release mechanism in a control of this character whereby when the gear or the controlling sleeve has been moved to the desired position the pressure between the collar and the sleeve flanges will be relieved, so that the collar will be free to seek an intermediate position between the flanges and avoid frictional contact therewith.

Another object of the invention is the provision of a reverse gearing clutch release whereby the clutch of a reverse gear may be positively and efficiently moved to a driving position and then automatically released to eliminate friction between the parts.

A still further object of the invention is the provision in a controlling device for a movable part whereby such part may be positively moved to a desired position and then automatically released from the controlling means.

A still further object of the invention is the provision between a controlled member and a controlling member therefor such that the controlling member will have both a rigid and lost-motion connection with the controlled member.

To these and other ends the invention consists in the novel features and combinations of parts to be hereinafter described and claimed.

In the accompanying drawings:

Fig. 4 is a view similar to Fig. 3 showing another position of the parts wherein the clutch is engaged;

Fig. 5 is a top plan view of a modified form of my invention applied to a manually operated reverse gear control;

Fig. 6 is a side elevational view partly in section showing the parts in the position obtaining when the clutch is in a neutral position, and Fig. 7 is a view similar to Fig. 6 showing the position of the parts when the clutch is engaged.

Figure 1:
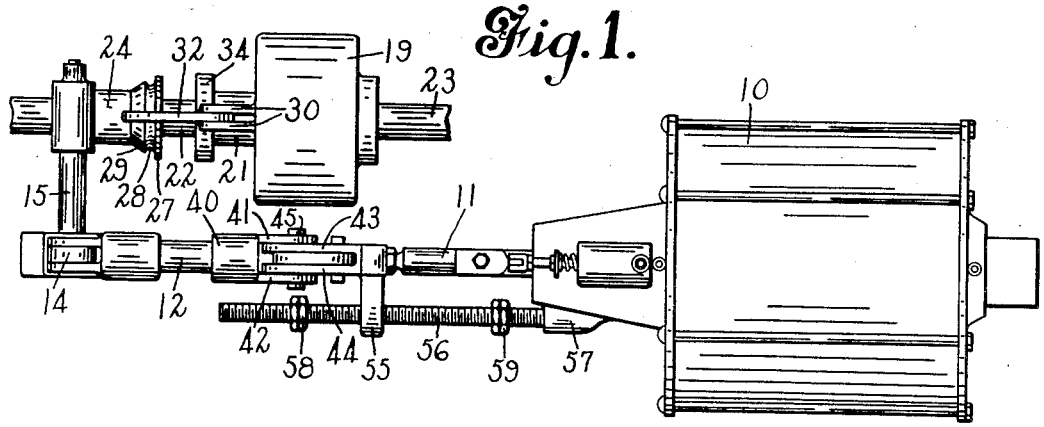
Fig. 1 is a top plan view of a reverse gear control mechanism embodying my invention.

In Figs. 1 to 4 of the drawings I have chosen to illustrate my invention as applied to a pneumatically operated reverse gear control. As shown in Fig. 1, the device comprises a cylinder 10 within which operates a piston rod 11, the end of which projects from the cylinder. It will be understood that the piston rod carries on the end within the cylinder a piston (not shown) which may be of the usual type so that when air or other fluid under pressure is introduced into the cylinder on either side of the piston, the piston rod will be moved in the proper direction.

The piston rod 11 is connected to a link 12 pivotally secured at 13 to a lever 14, the lower end of which is in turn secured to a shaft 15. On the end of this shaft is secured a bifurcated arm 16, the forked ends of which engage pins 17 secured upon a clutch collar 18 in the usual manner.

At 19 is illustrated more or less diagrammatically the casing of a reverse gearing which may be of the usual type and which includes a clutch member 20 secured to a sleeve 21 mounted upon the driven shaft 22. The driving shaft is shown at 23 and it will be understood that this shaft is actuated from a motor or other source of power.

A sleeve 24 is slidably and non-rotatably mounted upon the shaft 22 and this sleeve is provided with flanges 25 and 26 between which is disposed the clutch collar 18. At the end of the sleeve 24 opposite these flanges the sleeve is enlarged as shown at 27 and is provided with a groove 28 and a beveled portion 29 leading to this groove.

Figure 2:
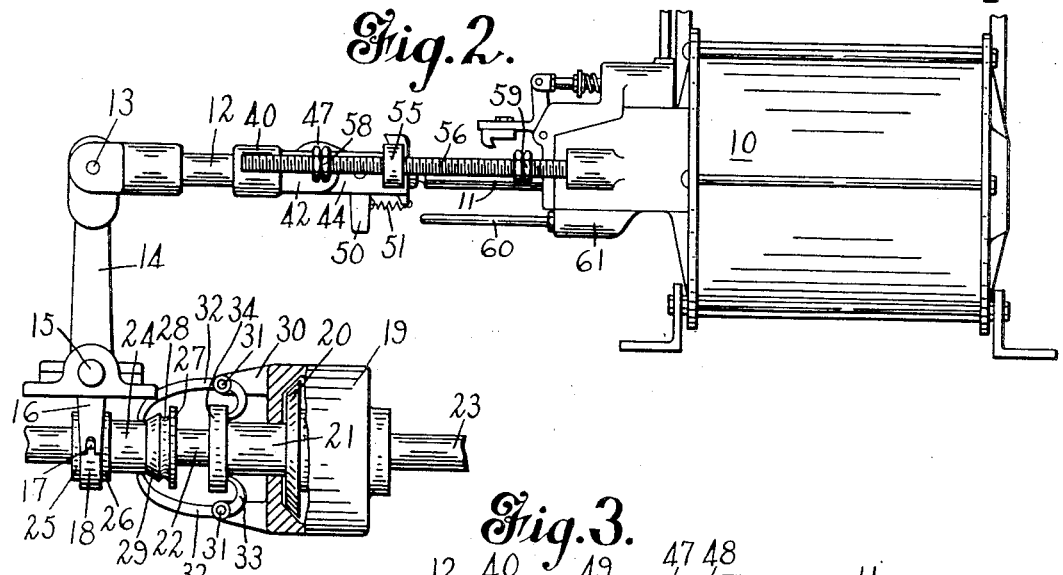
Fig. 2 is a side elevational view of the same.
Figure 3:
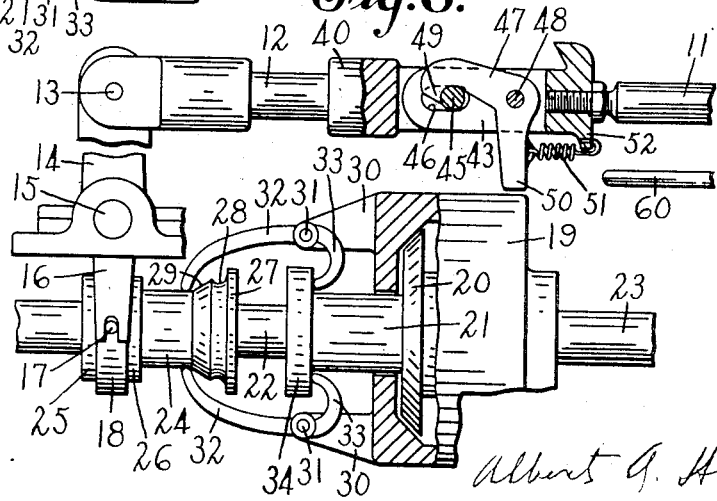
Fig. 3 is an enlarged elevational view of the control mechanism shown partly in section and showing the parts in the position obtaining when the gear is in neutral position.

The casing 19 is provided with forwardly extending ears 30 to which are pivoted at 31 levers 32 having rearwardly curved ends 33 designed to engage behind a flange 34 upon the sleeve 21 so as to move this sleeve to the left, as shown in Figs. 2 and 3, and engage the clutch 20 so that the shaft 22 will be driven by and with the shaft 23. In the usual construction, in this position of the parts the shaft 23, the casing 19 and the shaft 22 are locked together to be driven by the motor as a unit.

The other ends of the levers 32 are adapted to engage the sleeve 24 and, when this sleeve is moved to the left as from the position shown in Fig. 3 to that shown in Fig. 4, to ride up the inclined surface 29 and be engaged in the groove 28 so as to hold the clutch in the position in which it is engaged.

Referring to Figs. 3 and 4 of the drawings, it will be seen that the clutch sleeve 24 is moved to the left in order to engage the clutch, and the collar 18 will during such movement be forced frictionally against the flange 25. If a continuous pull is exerted on this clutch collar through the link 12 and piston 11, the pressure of the collar 18 against the flange 25 will be maintained during the operation of the shaft 22 with harmful results to the collar and flange, as it will be remembered that the sleeve 24 rotates continuously with the shaft 22 and rotates within and relatively to the collar 18.

The device for relieving the pressure between the collar and the flange will now be described. I provide means for relieving the pressure on the collar 18 by providing a novel form of connection between the piston 11 and the link 12. To this end the link 12 is provided at one end with a clevis 40 having spaced arms 41 and 42. The adjacent end of the piston is also bifurcated, having the spaced end portions 43 and 44. A pin 45 passes through openings in the arms 41 and 42 and through slotted openings 46 in the arms 43 and 44, so that while the pin is secured to the arms 41 and 42, it is allowed a certain freedom of movement within the slots 46 in the arms 43 and 44. In other words, a lost-motion connection is provided between the piston 11 and the link 12.

In order, however, that this lost-motion connection may be converted into a direct connection between these parts so that the link 12 will be positively moved in both directions by the piston 11, a pawl 47 is pivoted at 48 between the arms 43 and 44, this pawl as shown in Fig. 3 being provided with a hooked end 49 engaging over the pin 45 and holding it against the adjacent ends of the slotted openings 46. This pawl is provided with a depending tail portion 50 to which is connected one end of a spring 51, the spring having its other end secured to a lug 52 of a part of the piston 11. It will be observed that the action of the spring tends to move the pawl 47 downwardly to maintain its hooked end 49 in engagement with the pin 45, as shown in Fig. 3.

Upon the piston 11 is secured a lug 55, through an opening in which passes a rod 56 secured at its rear end at 57 to a part of the cylinder 10. The rod 56 is threaded and engaged with the threads thereon are stop nuts 58 and 59 which may be adjusted along the rod 56 to engage the lug 55 and limit to a proper extent the movement of the piston 11.

In order to insure that the clutch be fully engaged, it is usual and desirable that these stop members be set so that they permit the piston 11 to travel a slight distance beyond that point at which the ends of the levers 32 would be engaged in the groove 28, and, as a result, frictional pressure will be experienced between the clutch collar and the flange 25 to a harmful extent. In order to relieve this pressure I secure to a part of the cylinder 10 an abutment or stop rod 60 to engage the tail 50 of the pawl 47 at the time that the clutch is fully engaged. The rod 60 is threaded into a lug 61 upon a part of the cylinder so that it may be adjusted to some extent in order that it may be engaged by the pawl at the proper time.

When the pawl is engaged by the rod 60, the hooked end 49 thereof will be moved upwardly against the tension of the spring 51 so that the pin 45 will be released and will be allowed freedom of movement within the slots 46. As this pin is secured to the link 12 it will be apparent that the link 12 will be allowed to move to the left, as shown in Figs. 3 and 4, or to "back off" slightly so that the clutch collar 18 will be allowed to seek its own center between the flanges 25 and 26 and to be relieved of frictional pressure against either of these flanges.

While the operation of the device will probably be clear from the foregoing description, it may be briefly summed up as follows:

With the parts in the position shown in Figs. 2 and 3 wherein the clutch is in a neutral position, if it is desired to place the clutch in position for forward drive pressure fluid is admitted to the cylinder 10 upon the proper side of the piston to move the piston rod 11 to the right. As the pawl 47 engages the pin 45 the piston 11 is positively connected to the link 12 and this link will also be drawn to the right, moving the clutch collar 18 and therefore the sleeve 24 to the left. The ends of the levers 32 will ride up the inclined surface 29 and the ends 33 of these levers through their engagement with the flange 34 will move the sleeve 21 to the left and engage the clutch 20. When the clutch is fully engaged the tail 50 of the pawl 47 will strike the end of the stop rod 60 and release the pin 45 so as to break the positive connection between the piston 11 and the link 12 and allow the link 12 to back off to a certain extent to permit the clutch collar 18 to seat itself freely between the flanges 25 and 26. It will be understood that at this time the left-hand ends of the levers 32 will be engaged in the groove 28 and will hold the clutch in engaged position.

If it is now desired to release the clutch, pressure fluid is introduced in the cylinder 10 upon the proper side of the piston to move the piston rod 11 to the left, as shown in Figs. 2 and 3. With reference to Fig. 4, it will be apparent that during the initial part of this movement the link 12 will not be affected. As soon, however, as the piston 11 moves to the left to a sufficient extent to engage the pin 45 against the right-hand ends of the slots 46, the link 12 will be moved to the left to restore the parts to the position shown in Fig. 3. It will be understood that in this position the shaft 22 will be at rest. It will also be obvious that as soon as the tail 50 is disengaged from the end of the stop rod 60 the pawl will be moved downwardly by its spring 51 to engage the pin 45 and re-establish the positive connection between the piston 11 and the link 12. It will also be observed that by the provision of the connection shown between the link 12 and the piston 11 and due to the pivotal connection at 13, I am enabled to allow for the arcuate movement of the pivotal point 13 about the shaft 15, notwithstanding the fact that the piston rod 11 must move in a linear path, as this connection will permit misalignment of the piston 11 and link 12.

In Figs. 5 to 7 of the drawings I have illustrated my invention as applied to a manually controlled reverse gearing clutch release. It will be understood that the reverse gear and its controlling mechanism comprising the clutch fork 16, the clutch collar 18, the housing 19, the clutch 20, the sleeve 21, and shafts 22 and 23, are similar to the corresponding parts heretofore described in connection with Figs. 1 to 4. Also, the clutch operating sleeve 21 is operated by the levers 32 in the manner already described.

In this instance the clutch is operated by a manually actuated lever 70 pivoted at its lower end to a rod 71, which operates through a guide 72. A stop 73 on the rod 71 serves to contact with the guide and limit the movement of the rod. The rod 71 is connected to the upper end of the lever 14ª which is secured to the shaft 15, which carries the clutch fork 16, by a connection similar to that employed between the parts 11 and 12 in the form of my invention heretofore described.

It will be noted that the upper end of the lever 14ª is bifurcated to provide the spaced arms 74 and 75 between which lie the arms 76 and 77 of a clevis 78 secured on the rod 71. A pin 79 passes through openings in the arms 74 and 75 and through elongated slots 80 in the arms 76 and 77.

A pawl 81 is pivoted at 82 between the arms 76 and 77 and is provided with an end 83 engaging over the pin 79. The pawl 81 is provided with a tail portion 84 adapted to engage the end of a stop rod 85 adjustably secured in the guide standard 72. A spring 86 normally urges the pawl toward the position shown in Fig. 6 in which it is engaged with the pin 79.

In Fig. 7 of the drawings is shown the position of the parts when the clutch is engaged and the pin 79 has been released from the pawl 81 to permit the clutch collar 18 to seek a free position between the flanges 25 and 26 of the sleeve 24. The operation of this form of the device is substantially like that already described in connection with the modification shown in Figs. 1 to 4 and no further elaboration thereof will be needed.

While I have shown and described a preferred embodiment of my invention, it will be understood that it is not to be limited to the details shown but is capable of modification and variation within the spirit of the invention and the scope of the appended claims.

What I claim is:

1. In a clutch controlling device, a clutch engaging lever, operating means for said lever, and a connection between said operating means and the lever having provision for permitting relative movement therebetween, means to lock said connection to prevent such relative movement, means to disengage said locking means when the operating means has reached a position to engage the clutch, and means to thereafter retain the clutch in engaged position.

2. In a clutch operating device, pneumatic means connected to said clutch to move the same to engaged position, means to retain said clutch in said position, and means to automatically release the connection between said clutch and said moving means when it has reached said position.

3. In a device for operating the clutch mechanism of a reverse gear having a sleeve slidably mounted on the driven shaft of said gear, a clutch collar engaged with said sleeve, and means for operating said collar to move the sleeve to engage the clutch comprising a pair of members connected in substantial longitudinal alignment, and said connection being a combined direct and lost-motion connection and being convertible from one into the other after the clutch is engaged to permit the collar to assume a free position with respect to the sleeve.

4. In a device for operating the clutch mechanism of a reverse gear having a sleeve slidably mounted on the driven shaft of said gear, a clutch collar engaged with said sleeve, and means for operating said collar to move the sleeve to engage the clutch comprising a pair of members having their adjacent ends connected together, and said connection being a pin and slot connection, releasable means for holding said pin against movement in said slot, and means for automatically effecting the release of said securing means after the clutch is engaged to prevent binding of the collar on the sleeve.

5. Operating mechanism for a clutch comprising a sleeve, a collar surrounding said sleeve and engaged therewith to move the sleeve in opposite directions, means to move said collar comprising a pair of connected members, a pin carried by one of said members the other of said members being provided with a pair of slotted arms through which said pin passes, and means secured to said last-named member between said arms to engage the pin and hold it against movement in the slot, and means to release said pin when said sleeve has reached a predetermined position in its movement in a direction to engage the clutch to permit the collar to back off with relation thereto.

6. In a clutch operating device, a clutch operating member, means to connect said member with the clutch to move the same to engaged position, means to break said connection after the clutch is engaged, and means to thereafter retain the clutch in engaged position.

7. In a clutch operating device, a clutch operating member and means to move said member to engage the clutch, comprising a pair of members connected together, and said connection operating as a direct connection until said clutch is engaged and thereafter acting as a lost motion connection to relieve pressure upon the clutch-operating member while the clutch is still engaged.

8. In a clutch operating device, a clutch operating element and means to move said element to engage the clutch comprising a pair of members connected together and said connection comprising means for connecting said members directly together or for permitting lost motion therebetween, and means for automatically changing said connection from one form into the other after said clutch is engaged while maintaining the clutch in engaged position.

9. In a clutch operating device, means to move the clutch parts to engaged position, and means connecting said moving means to the clutch whereby said clutch is positively moved to engaged position and then released from said moving means without disengagement thereof.

10. In a clutch controlling device, a clutch operating member, means to move said member to engage the clutch and means to release said member from the moving means to permit the member to back off from the position to which it has been moved to relieve pressure upon said clutch-operating member while the clutch is engaged.

11. In a clutch controlling device, a clutch operating member, means to move said member to engage the clutch and means to release said member from the moving means after the clutch has been moved to engaged position to permit the member to back off from the extreme position to which it has been moved without disengaging the clutch.

12. In a clutch operating device, means to move said clutch to engaged position, means to retain said clutch in said position, and means to automatically release said clutch from the moving means when it has reached the engaged position to permit further movement of the moving means in the same direction without affecting the clutch.

13. In a clutch controlling device, a clutch operating member including a sleeve, a collar engaged with said sleeve, means connected to the collar to move the same to actuate the sleeve to engage the clutch, and means to break said connection after said clutch has been engaged to permit the clutch collar to back off against the direction and independently of movement of the moving means.

14. Clutch controlling means for reverse gearing, comprising a clutch operating member, means connecting said member to the clutch to move the same to engaged position, and means to break said connection, said means acting after the movement of said clutch operating member a predetermined amount in a direction to engage the clutch whereby further movement of the operating member in the same direction is permitted without affecting the clutch and means to retain the clutch in engaged position.

ALBERT A. HODGKINS.